United States Patent
van Zijderveld et al.

(10) Patent No.: US 6,296,110 B1
(45) Date of Patent: Oct. 2, 2001

(54) CONVEYING SYSTEM FOR CONVEYING PRODUCTS, AND SLIDE-OVER DEVICE

(75) Inventors: George Johannes van Zijderveld, Gravenzande; Franciscus Josephus Maria van Esch, Breda, both of (NL)

(73) Assignee: MCC Nederland B.V. (NL)

( * ) Notice: Subject to any disclaimer, the term of this patent is extended or adjusted under 35 U.S.C. 154(b) by 0 days.

(21) Appl. No.: 09/232,282

(22) Filed: Jan. 15, 1999

(30) Foreign Application Priority Data

Jan. 19, 1998 (NL) .................................................. 1008070

(51) Int. Cl.⁷ .................................................. B62G 17/08
(52) U.S. Cl. ........................................... 198/635; 198/325
(58) Field of Search ..................................... 198/635, 325

(56) References Cited

U.S. PATENT DOCUMENTS

| | | |
|---|---|---|
| 3,610,394 | 10/1971 | Sager . |
| 3,687,257 | 8/1972 | Johnson . |
| 4,765,454 * | 8/1988 | Hodlewshi et al. ............... 198/635 |
| 4,821,869 * | 4/1989 | Hodlewsky ....................... 198/779 |
| 4,858,751 * | 8/1989 | Hodlewsky ....................... 198/834 |
| 5,215,182 * | 6/1993 | Garbagnati ....................... 198/635 |
| 5,228,554 * | 7/1993 | Kuchta et al. ..................... 198/35 |
| 5,255,771 * | 10/1993 | Nurnberg et al. ................. 198/323 |
| 5,339,948 * | 8/1994 | Cox et al. ......................... 198/635 |
| 5,769,201 * | 12/1995 | Dwight et al. .................... 198/323 |
| 5,971,129 * | 12/1997 | Stawniak et al. .................. 198/325 |

FOREIGN PATENT DOCUMENTS

| | | |
|---|---|---|
| 20 38 966 | 2/1971 | (DE) . |
| 0 333 309 | 9/1989 | (EP) . |

* cited by examiner

Primary Examiner—Christopher P. Ellis
Assistant Examiner—Rashmi Sharma
(74) Attorney, Agent, or Firm—Varnum, Riddering, Schmidt & Howlett LLP

(57) ABSTRACT

A conveying system, comprising an endless conveyor mat extending between two divert wheels, for conveying products between the divert wheels in a conveying direction. The conveying system further comprises a slide-over device for transferring, adjacent a divert wheel from or towards the conveying face, products conveyed by the conveyor mat towards or from said divert wheel. The slide-over device comprises a number of fingers extending into the conveying face. The conveyor mat comprises a substantially flat conveying face having at least one substantially straight slot, extending in conveying direction. The fingers each cooperate with a slot. Each finger is connected to the slide-over device so as to be detachable substantially in vertical direction.

19 Claims, 9 Drawing Sheets

CONVEYING SYSTEM FOR CONVEYING PRODUCTS, AND SLIDE-OVER DEVICE

BACKGROUND OF THE INVENTION

1. Field of the Invention

The invention relates to a conveying system, comprising an endless conveyor mat extending between two divert wheels, for conveying products between the divert wheels in a conveying direction, which conveying system further comprises a slide-over device for transferring, adjacent a divert wheel from or towards a conveying face of the conveyor mat, products conveyed by the conveyor mat towards or from said divert wheel, which slide-over device comprises a number of separately detachable fingers extending into the conveying face, the conveying face being substantially flat and having a number of substantially straight slots extending in conveying direction, and each finger of the slide-over device cooperating with a slot.

The invention also relates to a slide-over device for transferring, adjacent a divert wheel from or towards a conveying face of a conveyor mat, products which are conveyed by that conveyor mat in a conveying direction towards or from said divert wheel, which slide-over device comprises a number of separately detachable and substantially parallel, outwardly extending fingers for cooperating with a conveying face.

2. Description of Related Art

Such conveying systems and slide-over devices are known and are used for conveying all kinds of products in a large number of different environments. A particularly exacting application of such conveying system and such slide-over device concerns the transport and transfer of products through a pasteurizer for pasteurizing the products.

During pasteurization, products, in particular beverages, after having been introduced into a package, are heated for some time so as to prolong the storage life of the products. To that end, the sealed packages containing the product are placed on a conveying track and passed through an encasing forming a long, watertight tunnel. The conveying number of zones where warm water having per zone a different temperature is sprayed onto the packages, for instance 20–40–60–80–60–40° C. Such conveying track conveys the products at a speed of about 0.5–1 m/sec and has a capacity of about 30–70,000 packages per hour. In the temperature zones, about 25 $m^3$ water per hour is sprayed onto the products per $m^2$ track surface area. In order to use the water more efficiently, the conveying track is preferably of a double-decked design. The packages conveyed through the pasteurizer by means of the conveying track are usually pots or bottles manufactured from metal, plastic or glass.

For reasons of cost, attempts have been made to design the conveying track as an endless conveyor mat circulating in a conveying direction between a first divert wheel and a second divert wheel. Such conveyor mat is known from EP 0 339 309. The conveyor mat is built up from a large number of interconnected plastic modules, each built up from a number of fins extending in parallel, side by side relationship in conveying direction. A number of these fins are provided with a raised rib. The top sides of these ribs together constitute a conveying face. Adjacent the divert wheels, the products are transferred towards or from the conveying face by a slide-over device comprising a comb having a flat part that carries tooth-shaped projections. The teeth project between the raised ribs so that during discharging, the foremost products are transferred from the conveying face and pushed onto the flat part of the comb via the teeth by the following products, while via the second divert wheel, the modules continue their endless path. During the supply of products, the foremost products are pushed, at the location of the first divert wheel, from the flat part of the comb onto the conveying face via the teeth by following products.

A drawback of the known conveying system and of the existing slide-over device is that they are not suitable for conveying glass packages through a pasteurizer. As it is, during pasteurization, the pressure in the package increases This may lead to breakage of about 1% of the glass packages as a consequence of weak spots in the glass and/or an unduly high filling degree of the package. In the known conveyor mat and in the known conveying system, the glass fragments of the broken packages get stuck between the ribs and/or fins of the modules. Thus, the slide-over device gets damaged. In particular, the teeth of the comb break off or are bent by glass fragments stuck between the ribs and/or the fins, as a result of which they form an obstacle to the packages. Further, glass fragments may accumulate under the flat portion of the comb of the slide-over device, causing the comb to rise in the conveying plane and the teeth to form an obstacle to the products. Hence, in practice, in a pasteurizer for products packed in glass packages, such conveying systems and slide-over devices are hardly used as conveying track.

This is also the case when such plastic conveying systems and plastic slide-over devices are used in other circumstances where high requirements are imposed on the temperature resistance, wear resistance and sturdiness.

DE 20 38 966 teaches a slide-over device in the form of a finger plate whose fingers are each intended to cooperate with a longitudinal groove in the conveying face of a conveyor, such as a conveyor belt. The finger plate comprises a swivelable support beam to which the fingers are each separately detachably connected by means of a screw.

A drawback of this finger plate is that the fingers are not directly accessible for being detached, but first have to be swiveled upwards together with the support beam. In particular for applications where the fingers are poorly accessible and/or the slide-over device comprises a relatively large number of fingers, as in a slide-over device incorporated into a pasteurizer, the detachment and replacement causes problems.

SUMMARY OF THE INVENTION

The object of the invention is to provide a temperature resistant, wear resistant and sturdy conveying system and a temperature resistant, wear resistant and sturdy slide-over device of the type mentioned in the opening paragraph, in particular suitable for conveying glass packages through a pasteurizer, which conveying system and which slide-over device do not have the above-mentioned drawbacks. To that end, the conveying system according to the invention is characterized in that the fingers are each connected to the slide-over device so as to be detachable substantially in vertical direction. Thus, it is inter alia provided that if a finger breaks or bends, it can readily be removed as a separate unit and is directly accessible for replacement, while the other fingers can remain in position. By connecting the fingers to the slide-over device and/or each other by means of a snap connection, the removal and replacement may be further facilitated. It is observed that 'finger' is understood to mean the part cooperating with the groove and that the finger can hence be built up from a plurality of parts.

In another embodiment, the conveying system according to the invention is characterized in that the fingers each comprise a substantially flat support body carrying one finger adjacent one end thereof and carrying the fastening member adjacent the opposite end thereof, which support bodies constitute separating surfaces spaced apart transversely to the conveying direction with open interspace. As a result, at the location of the divert wheel, the slot can be protected against the intrusion of fragments, while fragments can be discharged between the separating surfaces. Should the open spaces between the support bodies become clogged, this is directly perceptible to an observer, so that the open spaces can be cleaned in time and in a simple manner.

The slide-over device according to the invention is characterized in that the fingers are each connected to the slide-over device for detachment substantially in vertical direction.

In another embodiment, the slide-over device according to the invention is characterized in that the fingers are each separately detachably connected to the slide-over device and/or each other by means of a snap connection. By connecting the fastening members to each other in such a manner that they are each separately detachable, the fingers can be connected to form a packet of fins which can economically be connected to a frame.

In yet another embodiment, the slide-over device according to the invention is characterized in that the support bodies are slidably connected to a frame, such that they can slide relative to the frame substantially transversely to the plane in which they lie. It is thus provided that during expansion of the conveyor mat, the fingers can slide transversely to the conveying direction. Moreover, through sliding, play of the conveyor mat transverse to the conveying direction can be taken up.

BRIEF DESCRIPTION OF THE DRAWINGS

Further features and advantageous constructions of the conveying system are given in the subclaims and will hereinafter be discussed on the basis of a number of embodiments of the invention shown in a drawing. In the drawings:

DETAILED DESCRIPTION

Figure 1:
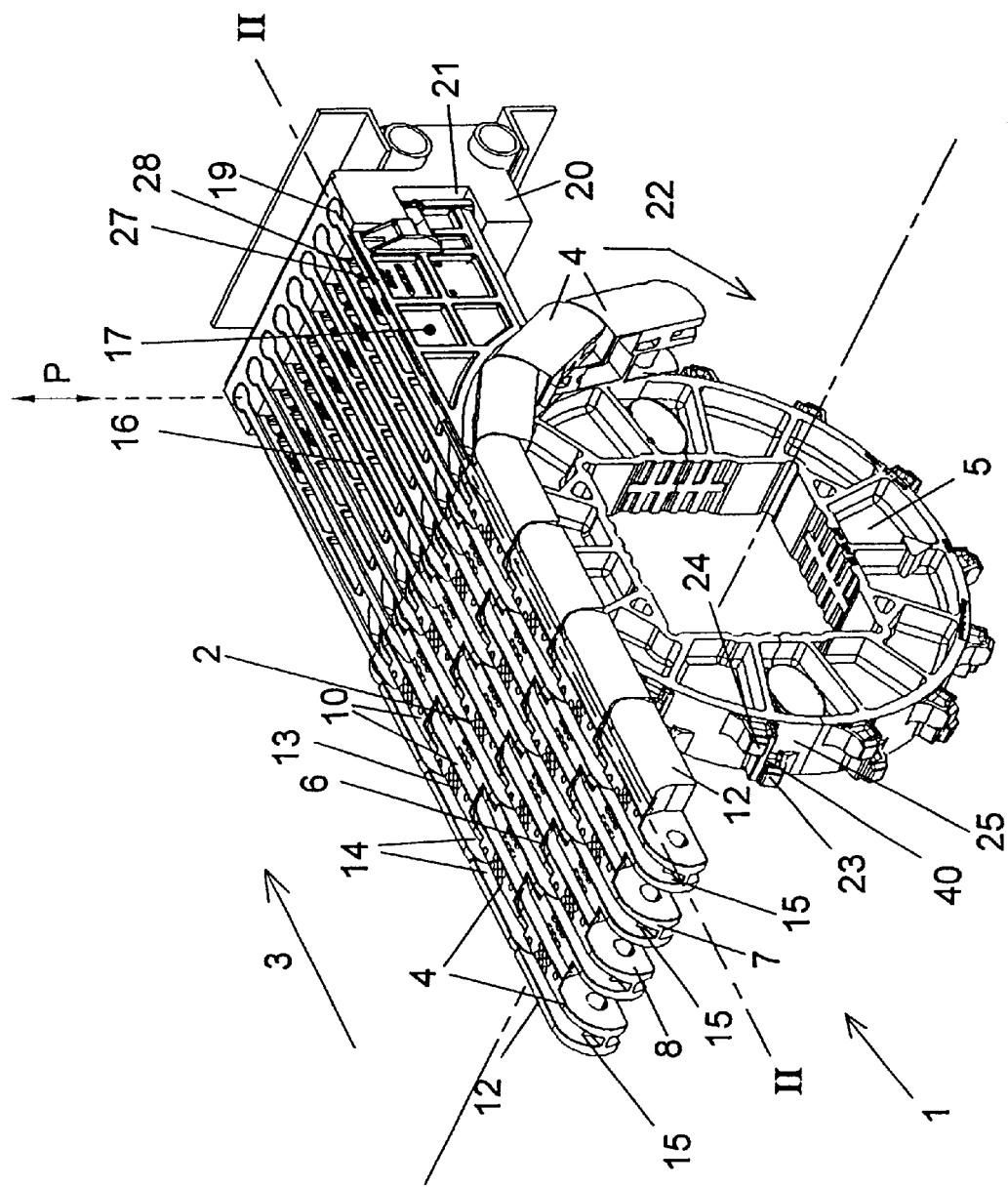
FIG. 1 is a schematic perspective drawing of a part of a conveying system according to the invention, which also shows a part of the slide-over device according to the invention.

The Figures are schematic representations of preferred embodiments of the invention and only serve as illustrations. In the Figures, identical or corresponding parts are designated by identical reference numerals.

Figure 2:
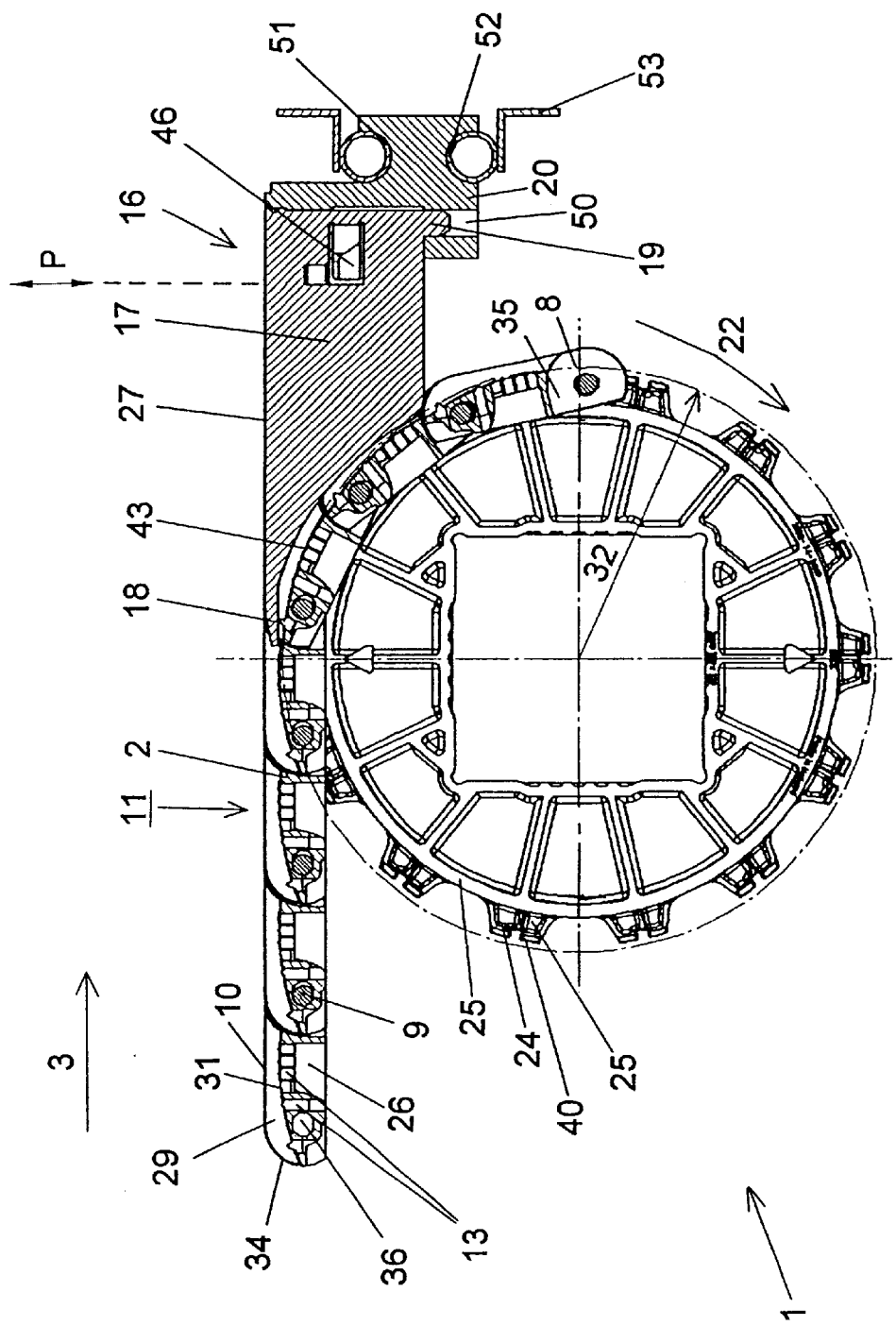
FIG. 2 shows a cross section of FIG. 1 along the line II—II.

Referring to FIGS. 1 and 2, a detail of the conveying system 1 according to the invention is shown therein. The conveying system 1 comprises an endless conveyor mat 2 traveling around two divert wheels. In FIGS. 1 and 2, only a part of the conveyor mat 2 is visible, adjacent the "end" of the conveyor mat 2 at the location where the conveyor mat 2 travels around a divert wheel 5. The conveyor mat 2 comprises a number of rows of plastic modules 4, succeeding each other in a conveying direction 3 and extending transversely to the conveying direction. In FIG. 1, of each row, only one module 4 is shown. In conveying direction, the modules 4 each have a front side 6 and a rear side 7. At their front and rear side 6, 7, the modules 4 are each provided with hinge loops 8. The hinge loops 8 of modules 4 succeeding each other in conveying direction 3 cooperate and are coupled by means of hinge pins 9 extending transversely to the conveying direction 3. The hinge pins 9 extend transversely to the conveying direction 3 throughout the width of the conveyor mat 4 and are preferably manufactured from plastic. The top faces 10 of the modules together constitute a conveying face 11.

Preferably, the conveyor mat 2 is built up from rows of modules 4 whose lateral sides 12 abut against each other, while the modules 4 of rows that succeed each other in conveying direction 3 are staggered relative to each other, as in a brickstone pattern. The modules 4 are each provided with through openings 13 extending substantially transversely to the conveying face 11. It is observed that "openings 13 extending substantially transversely to the conveying face 11" should also be understood to include openings extending obliquely from the top face 10 to the bottom side 37 of the module 4. The modules 4 have a substantially flat top face 10 in which grooves 14 extending in conveying direction 3 are provided. The modules 4 are coupled in such a manner that the conveying face 11 is substantially flat and comprises a number of substantially straight slots 15 which extend in conveying direction 3 over the length of the conveyor mat 2 and are built up of grooves 14.

The conveying system 1 further comprises a slide-over device 16 arranged adjacent the divert wheel 5, for transferring, from the conveying face 11, products which are conveyed by the conveyor mat 2 in the conveying direction 3 to the divert wheel 5. The slide-over device 16 comprises a number of substantially flat support bodies 17, each carrying a finger 18 at one end thereof and comprising, at an opposite end, a cylindrical fastening member 19. By means of their fastening members 19, the support bodies 17 are each separately mounted in fastening openings 21 in the mounting block 20 in such a manner that their respective fingers 18 each cooperate with one of the slots 15, while between the support bodies 17, an interspace 28 is present.

The operation of the conveying system is as follows. Products placed on the conveying face 11 of the conveyor mat 2 are displaced in the conveying direction 3 by driving the divert wheel 5 in the direction of the arrow 22. As a result, the projections 23, 24 provided on the outer circumference 25 of the divert wheel 5 engage the modules 4 in the chambers 26. At the location of the divert wheel 5, the modules 4 of the conveyor mat 2 first follow the outer circumference 25 of the divert wheel 5 over about 180° and subsequently follow the return side of their endless path. At the divert wheel 5, the products are transferred away from the conveying face 11, via the slide-over device 16. Indeed, at the location of the divert wheel 5, the fingers 18 of the slide-over device 16 project into the slots 15, preferably to a position above or beyond the center line of the divert wheel 5, causing the products which lead in conveying direction 3 to be transferred from the conveying face 11 by the following products, and to be pushed thereby, via the fingers 18, onto the top side 27 of the support bodies 17, in the direction of the mounting block 20. Next, the products are further discharged in a generally known manner.

The products can be placed on the conveying face 11 by means of a slide-over device 16 arranged adjacent the first divert wheel, of which slide-over device the fingers 18 project in conveying direction 3 into the slots 15 (not shown). To that end, the products are transferred, by products that follow in conveying direction, over the top sides 27 of the support bodies 17 and via the fingers 18, to the conveying face 11, while dirt, etc. falls into the spaces 28 between the support bodies 17.

When the products are glass bottles and when the system 1 is used as conveying track in a pasteurizer as described hereinabove, a number of bottles will break during transport and because of the shape of the modules 2, glass fragments and large pieces of dirt will accumulate on the conveyor belt. The through openings 13 of the modules 4 enable water, smaller parts of dirt and glass grit to be discharged from the conveying face 11 through the modules 4 during transport. Glass fragments and larger parts of dirt are removed from the conveying face by the fingers 18 and fall down via the spaces 28 between the support bodies 17. Should the open spaces 28 between the support bodies 17 become clogged, this is directly perceptible to an observer, so that the open spaces can be cleaned in time. When a finger 18 or a support body 17 is damaged or bends, for instance because of a glass fragment stuck in the conveying face 11, this is likewise directly perceptible. A support body 17 whose finger 18 is damaged or which itself is damaged, can simply be replaced as a loose unit by removing the support body 17 from the mounting block 20 substantially in vertical direction and by subsequently fitting a new finger substantially in vertical direction, in a manner which will be explained in more detail in the discussion of the mounting block 20.

Referring to FIGS. 3–9, different parts of the conveying system and of the slide-over device will be discussed in more detail. It is observed that the exemplary embodiments discussed merely concern preferred embodiments and that within the framework of the claims, a great many other embodiments are possible.

Figure 3:
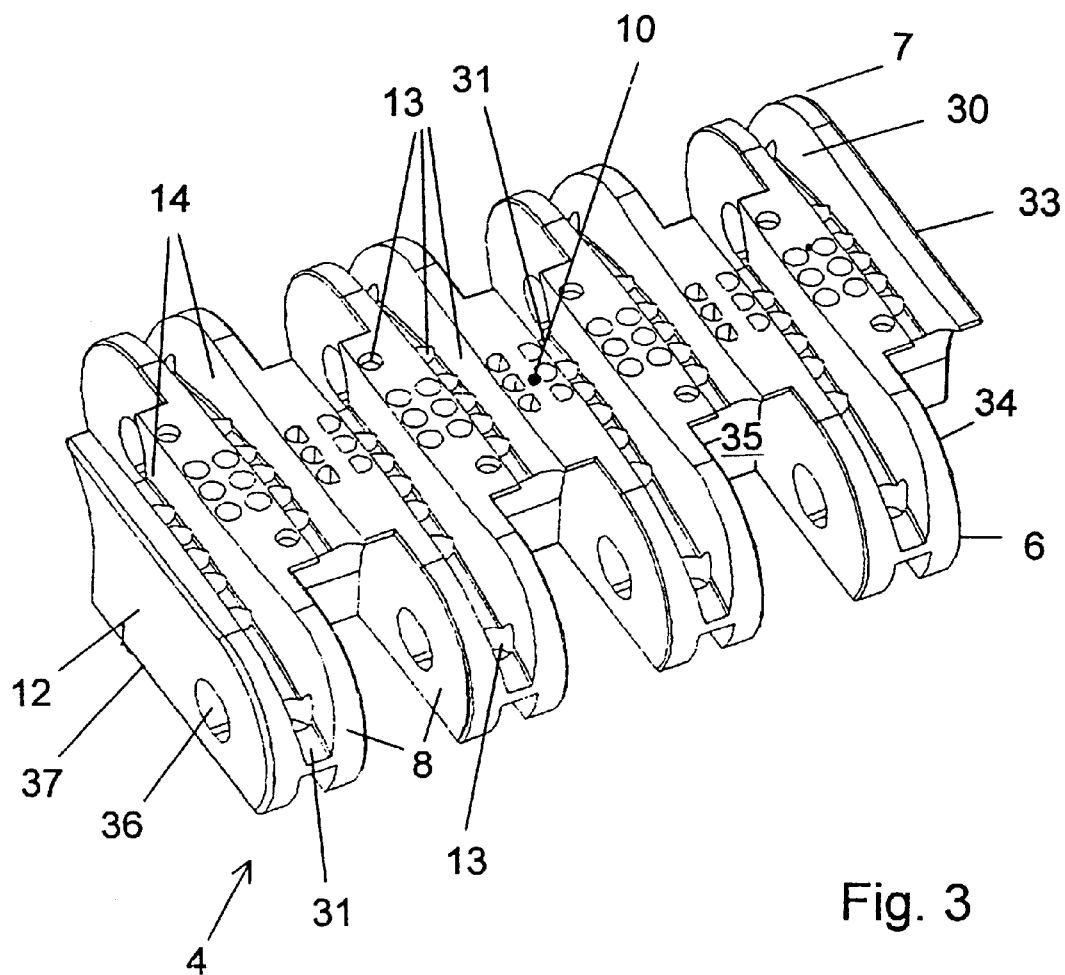
FIG. 3 is a schematic perspective drawing of a module of the conveyor mat of the conveying system of FIG. 1, viewed from the top.
Figure 4:
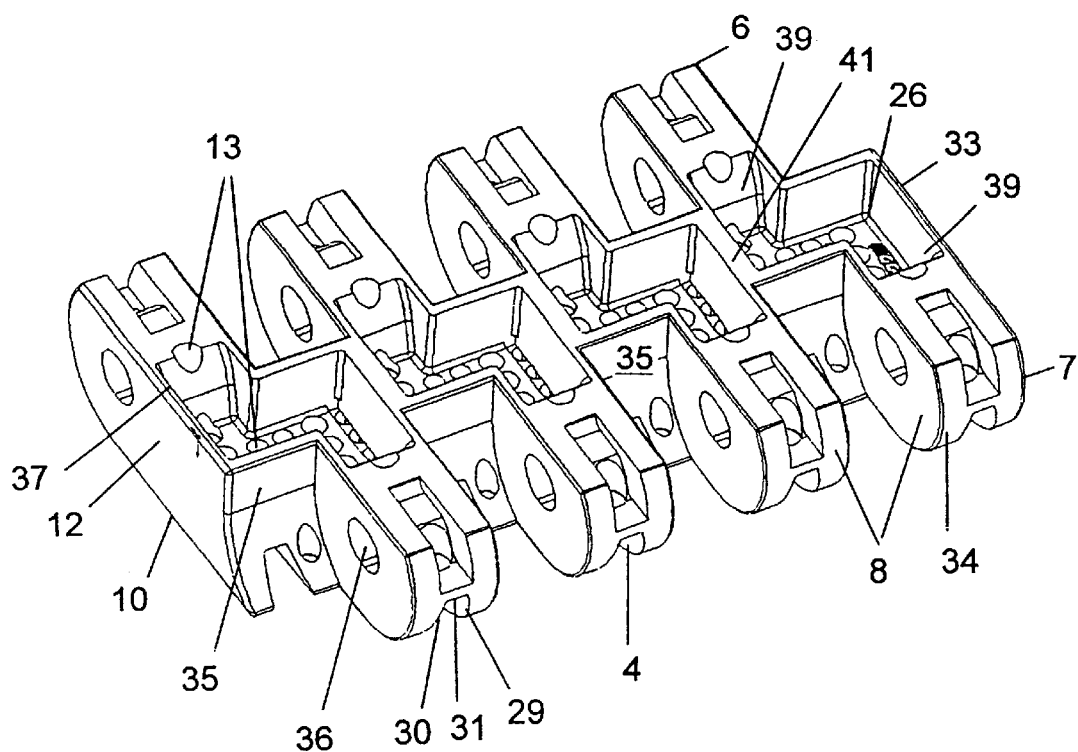
FIG. 4 is a schematic perspective drawing of a module of the conveyor mat of the conveying system of FIG. 1, viewed from the bottom.

Referring to FIGS. 3 and 4, a module 4 is shown therein. The top face 10 of the module 4 is substantially flat, allowing products to stand in a stable manner on the parts of the top face which are located between the grooves 14. The grooves 14 each have two sidewalls 29, 30 which are connected via a base 31, so that the chance of fragments falling through the module 4 is reduced. Transversely to the conveying direction, the grooves 14 have a trapezoidal section, which facilitates the cooperation with a finger 18. The base 31 of the grooves 14 is curved with a radius 32 such that when the conveyor mat 2 travels around a divert wheel 5, the slot 15 at that location forms a circular arc with the axis of the divert wheel 5 as center (FIG. 2). This prevents the flow of water in longitudinal direction of the slot 15 and prevents the fingers 18 from moving up and down relative to the conveying face 11 as a consequence of the conveyor mat deforming as a polygon at the location of the divert wheel 5, and/or prevents the formation of an opening and closing gap between the fingers 18 and the slot 15.

The section of the grooves 14 transverse to the conveying direction 3 adjacent the front side 6 and the rear side 7 of the module 4 is greater than adjacent the center 33 of the module 4, to facilitate the insertion of the finger 18 into the groove 14. The through openings 13 are designed as round holes provided both in the top face 10 of the module 4 and in the base 31 of the grooves 14 provided in the top face 10.

In a direction parallel to the conveying face, the through openings 13 have a greatest dimension of less than 15 mm, preferably less than 10 mm, in particular less than 7 mm. It is thus provided that the chance of glass fragments getting stuck in the through openings is reduced.

The module 4 has its front side 6 and rear side 7 provided with an equal number of hinge loops 8. In a direction transverse to the conveying direction 3, the hinge loops 8 are spaced apart a distance which is substantially equal to the width of a hinge loop 9, and at the front side 6 and rear side 7 of the module 4 they are staggered relative to each other by the width of one hinge loop. Consequently, particularly the shortening of the conveyor mat requires the removal of minimally only one row of modules 4. It is observed that modules 4 whose hinge loops 8 are not staggered relative to each other and/or which have an unequal number of hinge loops 8 at the front side 6 and the rear side 7, are also possible within the framework of the claims.

The hinge loops 8 are each provided with a fillet 34 touching the top face 10 of the module horizontally, with a radius of a constant magnitude, extending outwards from the center line of the hinge pins 9, parallel to the conveying direction 3, while the spaces between the hinge loops 8 are provided with a recess 35 shaped to correspond with the fillet 34. Thus, the conveyor mat 2 also has a flat conveying face 11 at the location of the transitions between the rows of modules 4. Moreover, during the bending of the conveyor mat 2, glass grit from the top side 10 is prevented from getting stuck in the space between the modules 4. The hinge loops 8 of the modules 4 each have a hinge hole 36 for accommodating a hinge pin 9. By giving the hinge hole 36 an elongated design, the assembly and disassembly of the hinge pins 9, inter alia, can be carried out in a simpler manner. The center lines of the hinge holes 36 are located at less than half the height of the module 4, i.e. closer to the bottom side 37 than to the top face 10, to prevent the action of glass grit from the bottom side.

Figure 5:
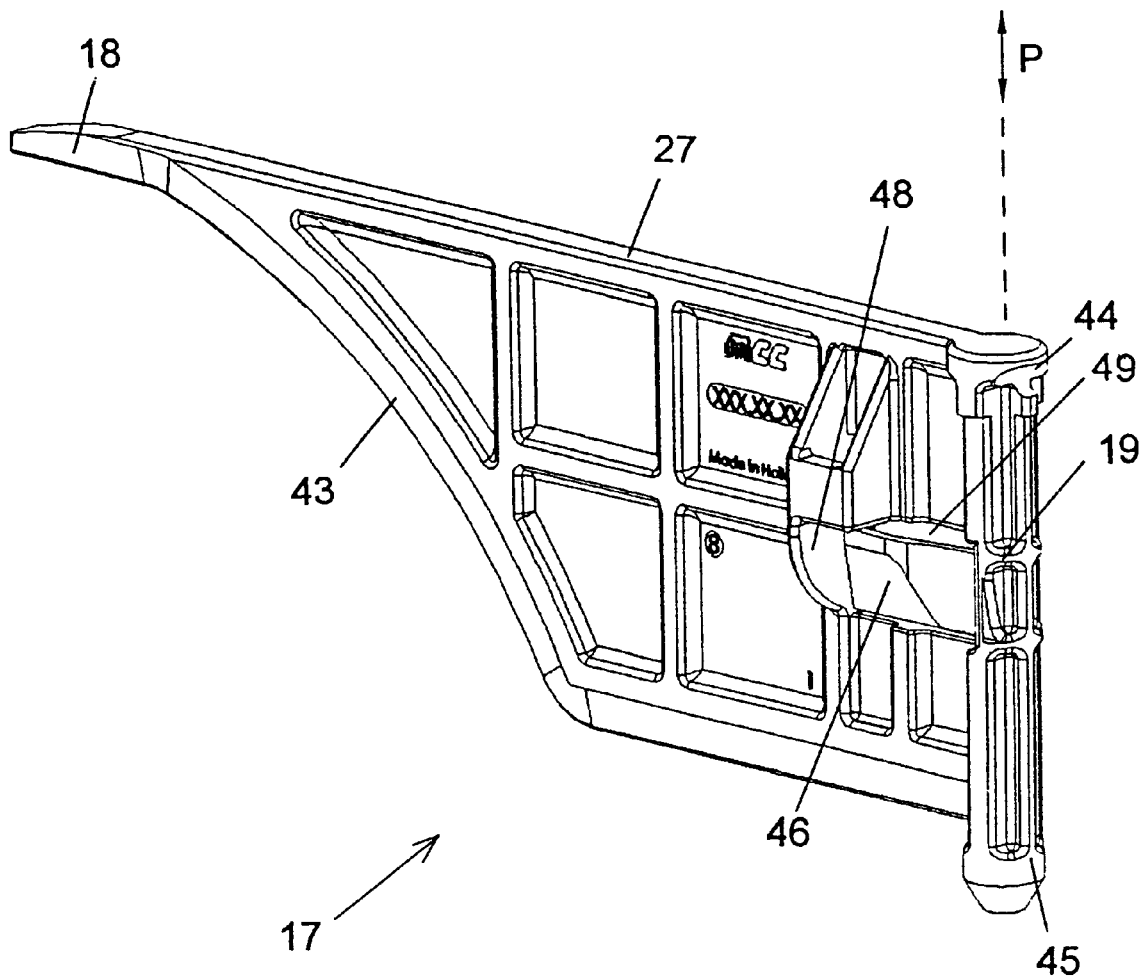
FIG. 5 is a schematic perspective drawing of a support body of the conveying system of FIG. 1.

Referring to FIG. 5, a support body 17 is shown therein, carrying a finger 18. The support body 17 is preferably manufactured from plastic. At its opposite side, the support body 17 comprises a fastening member 19. The support body 17 comprises a curved side 43 cooperating with the curvature of the slot 15 in the conveyor mat 2 at the location of the divert wheel 5 (FIG. 2). Preferably, the section of the finger 18 and the curved side 43 transverse to the conveying direction 3 is designed to correspond to the groove 14, and is in particular trapezoidal, so that the finger 18 and the curved side 43 protect at least the sidewalls of the slot 15 against the intrusion of glass. The support body 17 has a flat top side 27 for transferring products from the conveying face 11 in the direction of the mounting block 20. The fastening member 19 has at its top side 44 a greater diameter than at the bottom side 45, which will be discussed in more detail in the discussion of the mounting block. The support body 17 further comprises a snap connection, designed as snap finger 46 for cooperation with a corresponding recess 47 in the mounting block 20. The snap finger 46 comprises a cover 48 which protects the snap finger 46 from glass fragments and the like falling thereon, and which also acts as engagement member for operating the snap finger 46. By placing a bar, such as a screw driver, between the bracket 48 and the snap finger 46, it can engage the bracket 48 and the blocking of the snap finger 46 in a depressed condition is enabled. This facilitates the assembly/disassembly of the support body 17 on the mounting block 20.

Figure 6:
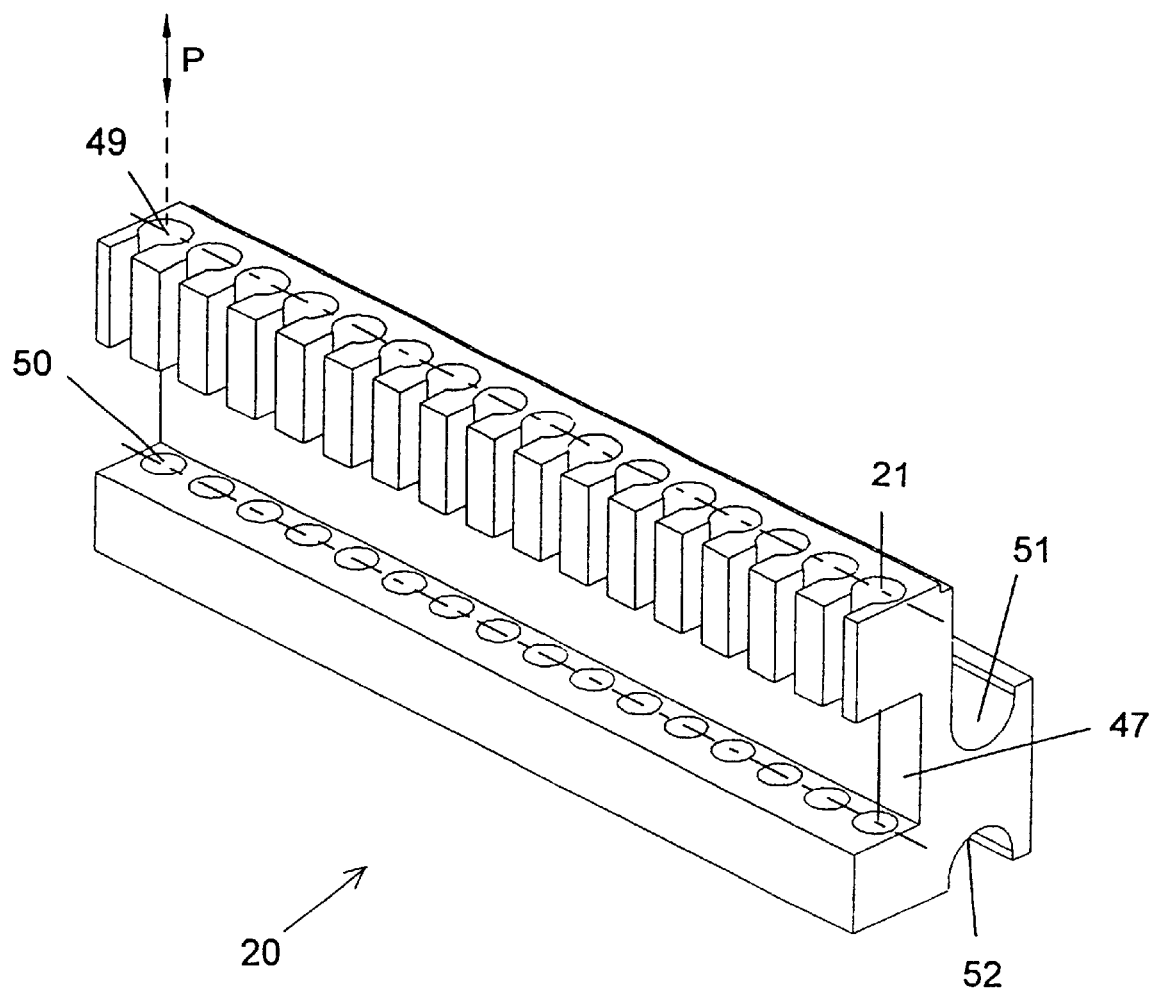
FIG. 6 is a schematic perspective drawing of a mounting block of the conveying system of FIG. 1.

Referring to FIG. 6, a mounting block 20 is shown therein, having a number of parallel fastening openings 21 spaced apart in transverse direction of the mounting block 20, comprising an upper row of holes 49 whose diameter is stepped from large to small over the longitudinal direction thereof, a recess 47 and a lower row of holes 50. In the case of a wide conveyor mat 2, a number of mounting blocks 20 are placed side by side, transverse to the conveying direction 3. The mounting block 20 is preferably manufactured from plastic. During the assembly of a support body 17 in the mounting block 20, the snap finger 46 of that support body 17 is first fixed in a folded-in position by passing a bar, such as a screw driver, between the snap finger 46 and the cover 48. Next, the fastening member 19 is passed substantially in vertical direction through one of the holes of the upper row of holes 49, until the bottom side 45 of the fastening member 19 is located in a corresponding hole of the lower row of holes 50. Upon removal of the screw driver, the snap finger 46 rebounds to lock the fastening member 19 through cooperation with the recess 47. By passing a bar into the slide-over device from above and positioning it between the snap finger 46 and the bracket 48, the snap connection can be unlocked and the support body 17 can be removed along with the bar in vertical direction. In the Figures, the vertical direction is indicated by an arrow P. In particular when the slide-over device is used within an encasing, such as in a pasteurizer, removal and replacement of the fingers may be substantially simplified thereby.

It is also possible to provide the snap finger 46 with a bevel whereby, during insertion, the snap finger is folded in through contact with an edge of the mounting block 20. In that case, the use of a bar during assembly is not necessary.

After assembly of the support bodies 17 to the block 20, the fingers 18 are each separately detachably connected to the slide-over device 16 and the support bodies 17 extend substantially parallel with mutual interspaces 28, and they each have their finger 18 projecting from the slide-over device 16 into a slot 15, against the conveying direction 3.

By giving the upper part 44 of the fastening member 19 a larger diameter than the lower part 45, it is provided that the upper part of the fastening member 19 contains sufficient material to take up forces in the conveying direction 3. By designing the upper row of holes 49 so that in mounting direction, they have a decreasing, preferably stepped, diameter, the material in transverse direction of the mounting block 20 between the holes 49, 50 moreover has sufficient strength to enable shortening the mounting block 20 in transverse direction between the holes 49, 50. In that case, the material next to a hole 49 adjacent the edge is sufficiently firm to support the support body 17 without bending outwards, which is not the case if the diameter is large throughout the length of the holes 49.

The mounting block 20 is further provided with two opposite slots 51, 52 extending transversely to the conveying direction 3, whereby the mounting block 20 can be mounted on a frame 53. Due to the temperature in the pasteurizer, the conveyor mat 2 will expand, for instance by 10 mm per meter at a temperature rise of 60° C. The slots 51, 52 have the advantage that upon expansion of the conveyor mat 2, the mounting block 20 can slide transversely to the conveying direction 3. The slots 51, 52 also permit expansion of the mounting block 20 relative to the frame 53, due to heating, without warping of the mounting block 20. In addition, through the use of the slots 51, 52, play of the conveyor mat 2 transverse to the conveying direction 3 due to small differences in the width of the hinge loops 8 and the space between the hinge loops of a module 4, can be taken up as well.

Figure 7:
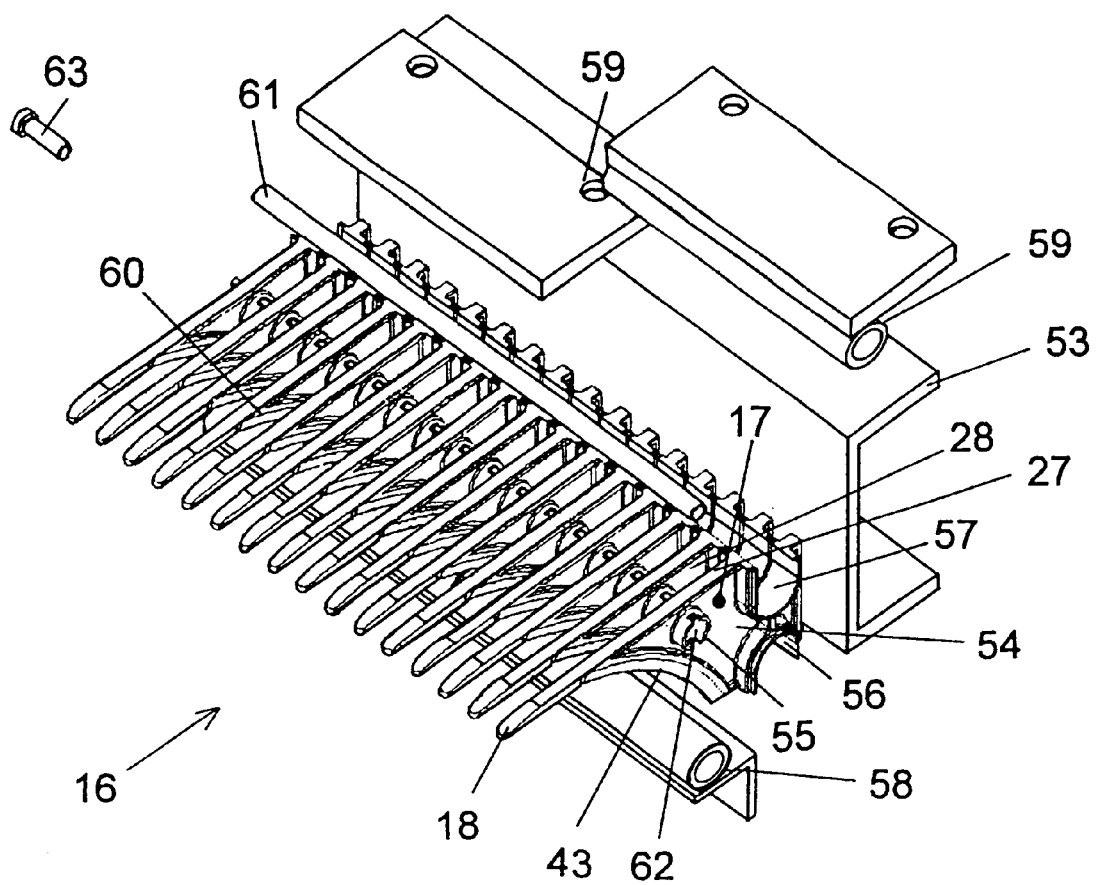
FIG. 7 is a schematic perspective drawing of another embodiment of the slide-over device according to the invention in partially disassembled condition.

Referring to FIG. 7, a schematic perspective drawing of another embodiment of the slide-over device 16 is shown therein, in partially disassembled condition. In this embodiment, too, the support bodies 17 are each located substantially in one plane and provided with a finger 18, a straight edge 27 and a curved edge 43. However, the support bodies 17 have their lateral sides 54 provided with a fastening member 55. By means of the fastening members 55, the support bodies 17 can each be separately detachably interconnected, while in each case a fastening member 55 cooperates with a lateral side (not visible in FIG. 7) of a next support body 17.

In FIG. 7, the support bodies 17 are interconnected with mutual interspaces 28 by means of the fastening members 55, transversely to the conveying direction 3, to form a packet of fins 60. This packet 60 can be directly connected to a frame 53 in an economical manner. Depending on the width of the conveyor mat 11, a number of these packets 60 are arranged side by side at the location of a divert wheel 5, transversely to the conveying direction 3, so that the fingers 18 of the support bodies 17 each cooperate with a slot 15 in the conveying face 11.

In this example, the support bodies 17 are each provided with opposite slots 56, 57 cooperating with a lower guide 58 and an upper guide 59. The guides 58, 59 are each mounted on the frame 53. This permits the packet of fins 60 to slide transversely to the conveying direction 3 to compensate for expansion of the conveyor mat 2 transverse to the conveying direction 3 and/or play of the conveyor mat 2 transverse to the conveying direction 3.

When a finger 18 or a support body 18 is damaged, the upper guide 59 is detached from the frame 53 first. After detachment of the packet of fins 60 from the lower guide 58, the damaged support body 17 is removed from the packet by removing the fastening member 55 from the lateral side of the adjoining support body 17 and/or removing the support body from the fastening member 55 of another adjoining support body. Via the fastening members 55, the fingers 18 are each separately detachably interconnected. After replacement of the support body 17, assembly can take place in the reverse order. If so desired, the stiffness of the packet 60 transverse to the conveying direction 3 can be increased by arranging a tension bar 61 straight through the packet of fins 60 via holes 62 in the support bodies 17, and to bias the bar with bolts 63. The operation of the slide-over device shown in FIG. 7 is further identical to that of the above-described slide-over device. It is observed that it is also possible to connect the support bodies to each other and/or the slide-over device so as to be directly detachable, for instance through the use of a simple, U-shaped guide.

Figure 8:
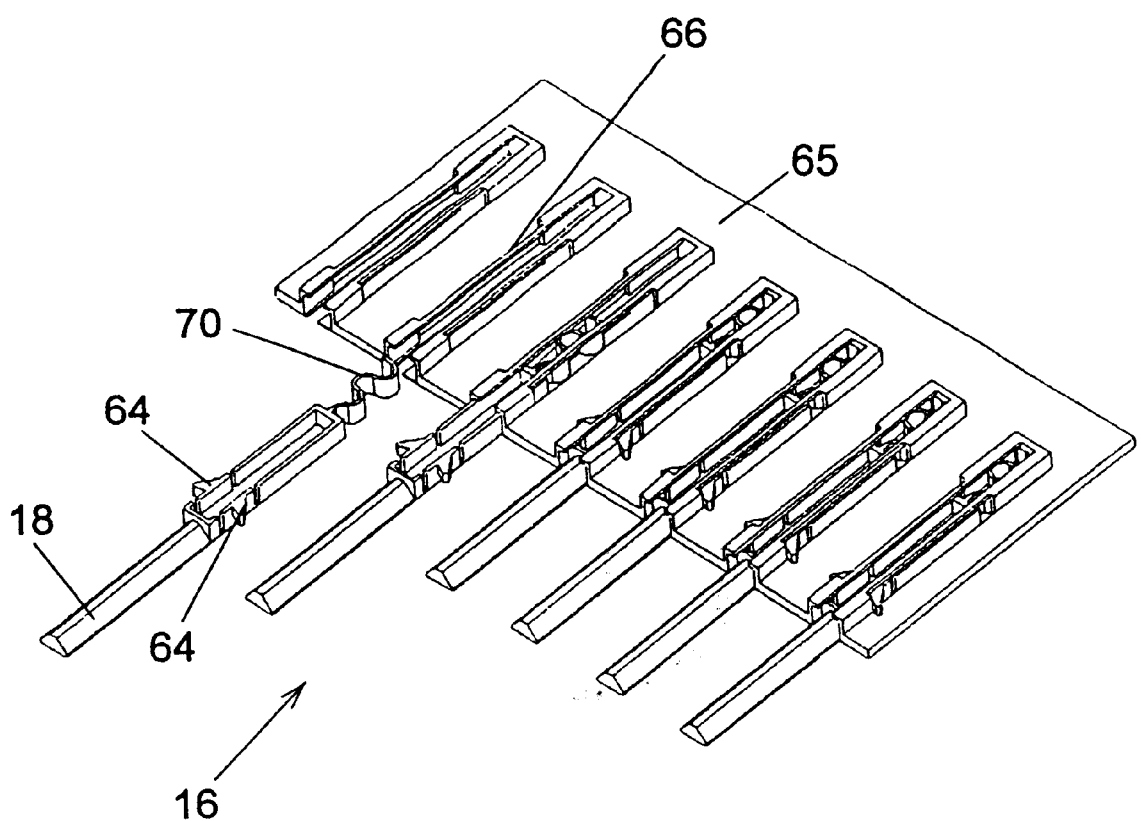
FIG. 8 is a schematic perspective drawing of yet another embodiment of the slide-over device according to the invention.

Referring to FIG. 8, it shows, in bottom view, a schematic perspective drawing of yet another embodiment of the slide-over device 16 according to the invention, where the fingers 18 are each separately detachably mounted on a guide plate 65 by means of two opposite, wedge-shaped fastening members 64. Adjacent a divert wheel 5, the guide plate 65 is connected to a frame 53, such that the fingers 18 each cooperate with a slot 15 in the conveying face 11. In this embodiment, the products are pushed, by following products, from the conveying face 11 towards the guide plate 65 via the fingers 18, and are subsequently discharged further. To decrease damage to the fingers 18, the fingers 18 are resiliently retained within guides 66 by means of springs 70. An object clamped in the conveying face in a slot 15 and touching the finger 18 frontally, pushes the finger 18 into the guide 66, against the action of the spring 70. After the object has passed the finger 18, the finger 18 rebounds.

When a finger 18 is damaged or a guide 66 is fouled, the finger 18, after the guide plate 65 has been detached from the frame 53, can be separately detached from the guide plate 65 by pressing the opposite fastening members 64 towards each other so that the finger can be taken from the guide 66. Attachment takes place by pressing the finger 18 into the guide 66.

Figure 9:
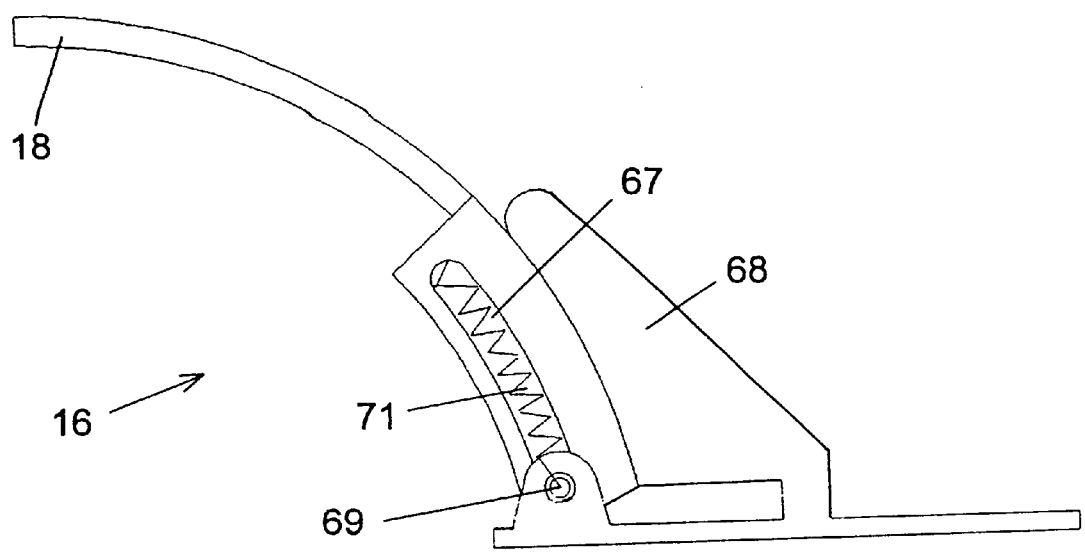
FIG. 9 is a schematic side elevation of a detail of yet another embodiment of the slide-over device according to the invention.

FIG. 9 is a schematic side elevation of a detail of yet another embodiment of the slide-over device 16 according to the invention. Here, the fingers 18 are provided with elongated eyes 67 as fastening members. The fingers 18 are curved and cooperate with the slot 15 at the location of the curvature around the divert wheel 5. Analogously with the exemplary embodiment of FIG. 8, the fingers 18 are loaded by springs 71. The fingers 18 are guided along support projections 68. The slide-over device 16 further comprises a guide plate, not shown in FIG. 9, onto which the products are transferred from the conveying face 11 via the fingers 18. The finger 18 can be detached as a loose unit after detachment of the spring 71 and the pivot 69.

It is observed that the application of the slide-over device discussed is not limited to the conveying system described in this example and that many variations of the conveying system and the slide-over device, in particular of the snap connection, are possible within the framework of the following claims.

What is claimed is:

1. A conveying system comprising:
   a divert wheel;
   an endless conveyor mat extending over said divert wheel for conveying products in a conveying direction, said conveyor mat having a substantially flat conveying face and a plurality of substantially straight slots in said conveying face extending in said conveying direction;
   a slide-over device disposed adjacent said divert wheel and comprising a plurality of fingers, each of said fingers cooperating with one of said straight slots;
   said fingers each connected to said slide-over device and detachable from said slide-over device substantially in a vertical direction.

2. The conveying system in accordance with claim 1 wherein said fingers are each connected to said slide-over device by a snap connection and said fingers are separately detachable from said slide-over device.

3. The conveying system in accordance with claim 2 wherein said snap connection comprises a snap finger and an engagement member for operating said snap finger.

4. The conveying system in accordance with claim 1 wherein said fingers each comprise a snap finger and said system comprises an engagement member for operating said snap finger.

5. The system in accordance with claim 1, wherein said fingers each comprise a substantially flat support body and a fastening member and wherein said support bodies of said plurality of fingers comprise separating surfaces spaced apart in a direction extending substantially transverse to said conveying direction.

6. A conveying system in accordance with claim 1 wherein said divert wheel has a centerline and at least one of said fingers extends to a position above said centerline.

7. A slide-over device for transferring products from a conveying face of a conveyor mat adjacent a divert wheel, said slide-over device comprising a number of separately detachable and substantially parallel, outwardly extending fingers for cooperating with said conveying face, said fingers connected to said slide-over device and separately detachable from said slide-over device in a direction extending substantially perpendicular to said conveying direction.

8. The slide-over device in accordance with claim 7 wherein each of said fingers is connected to said slide-over device by a snap connection and said fingers are separately detachable from said slide-over device.

9. A slide-over device in accordance with claim 7 wherein said fingers each comprises a substantially flat support body and a fastening member supported on said support body.

10. The slide-over device in accordance with claim 9 wherein the support body comprises a curved edge for cooperating with a curved slot in a conveyor mat.

11. The slide-over device in accordance with claim 9 wherein said support body comprises a substantially straight edge for guiding products.

12. The slide-over device in accordance with claim 9 wherein said support body forms spaced apart separating surfaces.

13. The slide-over device in accordance with claim 9 and further comprising a frame and wherein said support bodies are disposed on a plane and slideably connected to said frame such that said support bodies can slide relative to the frame in a direction extending substantially transverscent to said plane.

14. The slide-over device in accordance with claim 13 and further comprising a mounting block and wherein said support bodies are connected to said frame via said mounting block.

15. The slide-over device in accordance with claim 14 wherein said mounting block comprises a plurality of spaced apart, substantially parallel fastening openings for receiving said fastening members of said support bodies;
   said fastening openings, when viewed in a direction of insertion of said fastening members, having a decreasing diameter.

16. The slide-over device in accordance with claim 9 wherein said snap connection comprises a snap finger provided on said support body.

17. The slide-over device in accordance with claim 16 wherein said support body comprises a bracket disposed on said snap finger for operating said snap finger.

18. The slide-over device in accordance with claim 7 and further comprising a plurality of springs connecting said fingers to said slide-over device.

19. The slide-over device in accordance with claim 7 wherein said fingers are curved fingers.

* * * * *